(12) United States Patent
Choi et al.

(10) Patent No.: US 9,137,814 B2
(45) Date of Patent: Sep. 15, 2015

(54) CROSS-LAYER SCHEDULING BASED ON LOWER LAYER FEEDBACK

(71) Applicant: Marvell World Trade Ltd., St. Michael (BB)

(72) Inventors: Jihwan P. Choi, Daegu (KR); Jiwon S. Han, San Ramon, CA (US); Krishna Srikanth Gomadam, San Jose, CA (US); Yakun Sun, Sunnyvale, CA (US); Mingguang Xu, San Jose, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 185 days.

(21) Appl. No.: 13/774,654

(22) Filed: Feb. 22, 2013

(65) Prior Publication Data

US 2013/0223365 A1  Aug. 29, 2013

Related U.S. Application Data

(60) Provisional application No. 61/603,050, filed on Feb. 24, 2012.

(51) Int. Cl.
*H04W 4/00* (2009.01)
*H04W 72/12* (2009.01)
*H04L 1/18* (2006.01)
*H04L 1/00* (2006.01)

(52) U.S. Cl.
CPC ............. *H04W 72/12* (2013.01); *H04L 1/1812* (2013.01); *H04L 1/0001* (2013.01); *H04L 1/188* (2013.01); *H04L 1/1848* (2013.01)

(58) Field of Classification Search
None
See application file for complete search history.

(56) References Cited

U.S. PATENT DOCUMENTS

| | | | |
|---|---|---|---|
| 2004/0033801 A1* | 2/2004 | Yi et al. | 455/428 |
| 2005/0066255 A1* | 3/2005 | Jiang | 714/776 |
| 2006/0056441 A1* | 3/2006 | Jiang | 370/449 |
| 2007/0086367 A1* | 4/2007 | Sung et al. | 370/278 |
| 2011/0075620 A1* | 3/2011 | Jang et al. | 370/329 |
| 2011/0161768 A1 | 6/2011 | Chang et al. | |
| 2014/0071948 A1* | 3/2014 | Kim et al. | 370/331 |
| 2014/0286266 A1* | 9/2014 | Sammour et al. | 370/329 |

OTHER PUBLICATIONS

3rd Generation Partnership Project; Technical Specification Group Radio Access Network; Evolved Universal Terrestrial Radio Access (E-UTRA); Physical layer procedures (Release 10), pp. 1-125 (Dec. 2011).

(Continued)

*Primary Examiner* — John Blanton
*Assistant Examiner* — Thinh Tran

(57) ABSTRACT

Systems, methods, apparatus, and techniques are provided for retransmitting packets of data. A Radio Link Control (RLC) layer data packet is generated, and the RLC layer data packet is converted to one or more physical (PHY) layer data packets. The one or more PHY layer data packets are transmitted. At least one of a hybrid automatic transmission request (HARQ) acknowledgement (ACK) message and a HARQ negative acknowledgment (NACK) message is received from a receiver in response to transmission of the one or more PHY layer data packets. It is determined whether the at least one of the HARQ ACK message and the HARQ NACK message represents a automatic transmission request (ARQ) ACK message or a ARQ NACK message.

18 Claims, 4 Drawing Sheets

(56) References Cited

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), pp. 1-194 (Dec. 2011).

3rd Generation Partnership Project; Technical Specification Group Radio Access Network; Evolved Universal Terrestrial Radio Access (E-UTRA); Medium Access Control (MAC) protocol specification (Release 10), pp. 1-54 (Dec. 2011).

3rd Generation Partnership Project; Technical Specification Group Radio Access Network; Evolved Universal Terrestrial Radio Access (E-UTRA); Radio Link Control (RLC) protocol specification (Release 10), pp. 1-39 (Dec. 2010).

3rd Generation Partnership Project; Technical Specification Group Radio Access Network; Evolved Universal Terrestrial Radio Access (E-UTRA); Radio Resource Control (RRC); Protocol specification (Release 10), pp. 1-296 (Dec. 2011).

International Search Report and Written Opinion dated May 6, 2013 in International Application No. PCT/US2013/027291.

\* cited by examiner

CROSS-LAYER SCHEDULING BASED ON LOWER LAYER FEEDBACK

CROSS-REFERENCE TO RELATED APPLICATIONS

This patent document claims the benefit of, and priority to, U.S. Provisional Application No. 61/603,050, filed Feb. 24, 2012, the disclosure of which is hereby incorporated by reference herein in its entirety.

FIELD OF USE

This disclosure relates to retransmission techniques, such as automatic retransmission request (ARQ) and hybrid automatic transmission request (HARQ) techniques, for enabling reliable communications between a transmitter and receiver in a communications system.

BACKGROUND OF THE DISCLOSURE

Current cellular systems such as Third Generation Partnership Project Long Term Evolution (3GPP LTE) and Worldwide Interoperability for Microwave Access (WiMAX) employ both ARQ and HARQ retransmission schemes. ARQ is implemented at a high level of a protocol stack (e.g., the Radio Link Control (RLC) layer) with a relatively long retransmission time out period, while HARQ is implemented at a low level of the protocol stack (e.g., the medium access control (MAC) and physical (PHY) layers). Additionally, ARQ and HARQ utilize separate and independent mechanisms to provide feedback from a receiver to a transmitter of a communications system so that the transmitter may learn a pass or fail status of received packets. Use of separate feedback for the ARQ and HARQ processes is based on a layered approach to data transmission in cellular systems.

SUMMARY OF THE DISCLOSURE

Systems, methods, apparatus, and techniques are provided, for retransmitting packets of data. A RLC layer data packet is generated, and the RLC layer data packet is converted to one or more PHY layer data packets. The one or more PHY layer data packets are transmitted. At least one of a HARQ acknowledgement (ACK) message and a HARQ negative acknowledgment (NACK) message is received from a receiver in response to transmission of the one or more PHY layer data packets. It is determined whether the at least one of the HARQ ACK message and the HARQ NACK message represents a automatic transmission request (ARQ) ACK message or a ARQ NACK message.

In some arrangements, the RLC layer data packet is re-converted into one or more additional PHY layer data packets in response to a determination that the at least one of the HARQ ACK message and the HARQ NACK message represents the ARQ NACK message. In some arrangements, the RLC layer data packet is converted to one or more PHY layer data packets based on (i) a packet size parameter, (ii) a modulation type parameter, and (iii) a coding scheme parameter, after the converting, at least one of (i) the packet size parameter, (ii) the modulation type parameter, and (iii) the coding scheme parameter is changed, and the RLC layer data packet is reconverted into one or more additional PHY layer data packets based on the change.

In some arrangements, the RLC layer data packet is a current RLC layer data packet and a new RLC layer data packet is generated in response to a determination that the at least one of the HARQ ACK message and the HARQ NACK message represents the ARQ ACK message. In some arrangements, at least one of the HARQ ACK message and the HARQ NACK message includes at least two HARQ ACK messages or at least two HARQ NACK messages. In some arrangements, transmission of RLC polling status messages is disabled. In some arrangements, RLC status reports are disabled.

In some arrangements, it is determined the at least one of a HARQ ACK message and the HARQ NACK message represents the ARQ NACK message in response to receiving a pre-specified number of consecutive HARQ NACK messages. In some arrangements, it is determined whether the at least one of the HARQ ACK message and the HARQ NACK message represents the ARQ ACK message or the ARQ NACK message approximately once every 45 milliseconds (ms). In some arrangements, HARQ ACK messages and HARQ NACK messages are transmitted according to a 3GPP LTE or WiMAX standard.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Disclosed herein are cross-layer techniques for reducing an amount of overhead (e.g., an amount of data and a time delay associated with providing feedback) for performing data transmissions between a transmitter and a receiver in a wireless communications system. To provide efficiency gains, in some implementations, the disclosed techniques combine or merge certain functions traditionally performed in two or more of RLC, MAC, and PHY layers of a protocol stack.

Figure 1:
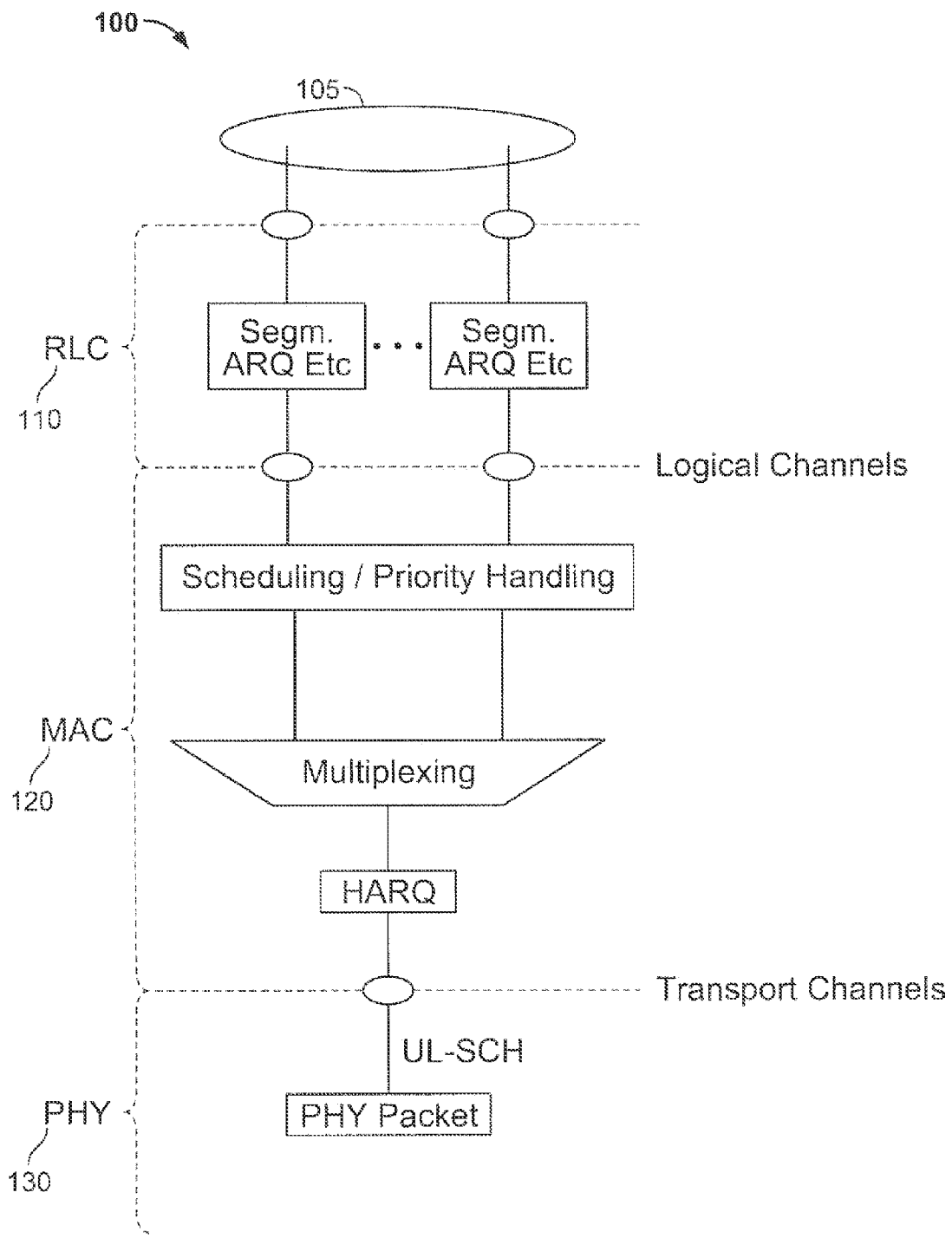
FIG. 1 depicts functionality of a transmitter implemented at various protocol layers in an uplink transmission in accordance with some implementations.

FIG. 1 depicts functionality of a transmitter 100 implemented at various protocol layers in an uplink transmission in accordance with some implementations. Specifically, the functionality of transmitter 100 is separable into functionality associated with an RLC layer 110, MAC layer 120, and PHY layer 130. Data corresponding to a number of logical channels is received at inputs 105. As part of the functionality of the RLC layer 110, the data is segmented or concatenated and otherwise prepared for ARQ-based transmission.

Specifically, under ARQ, information of an entire data packet that is erroneously received (or never received prior to a time out) at a receiver is retransmitted. However, upon retransmission, the data packet itself may be modified through processing at the transmitter to give the data packet a different form. The different form is intended to increase a probability that the data packet is successfully received at the receiver. For example, the data may be segmented into smaller packets upon retransmission (to increase an effective signal to noise ratio). Additionally or alternatively, a modulation type or coding scheme of the data packet may be modified upon retransmission.

ARQ retransmissions are typically employed only after one or more HARQ based retransmissions fail (HARQ is described further below in connection with the MAC layer 120). In particular, unlike with HARQ packets, combining is not performed among initial ARQ packet retransmitted versions of the initial ARQ packet. Further, ARQ retransmissions occur on a slower time scale than HARQ retransmissions. For example, in some implementations, ARQ packets are retransmitted after a time out period of 35-45 ms, whereas HARQ packets are retransmitted once every 8-10 ms. Generally, ARQ retransmissions may be initiated by either a transmitter or receiver (though, in some implementations ARQ transmissions are initiated by exactly one of the transmitter and the receiver). In particular, the transmitter may poll the receiver to ask for a "status report" providing a list of missing (or not-yet) received packets enumerated by packet sequence numbers. Additionally or alternatively, the receiver may send an ARQ NACK for a given packet sequence number after a time out period for the packet expires.

As part of the functionality of the MAC layer 120, the data received from the RLC layer 110 is prepared for HARQ-based transmission. Specifically, under HARQ, a data packet is retransmitted one or more times so that all received copies of the data packet may be combined at the receiver for increased decoding performance. Further, in order to facilitate combining of retransmitted data packets at the receiver, packet size and contents are maintained in each HARQ retransmission. ACK and NACK signaling is used by the receiver to inform a transmitter of whether a data packet was successfully received or if a data packet should be HARQ retransmitted.

Figure 2:
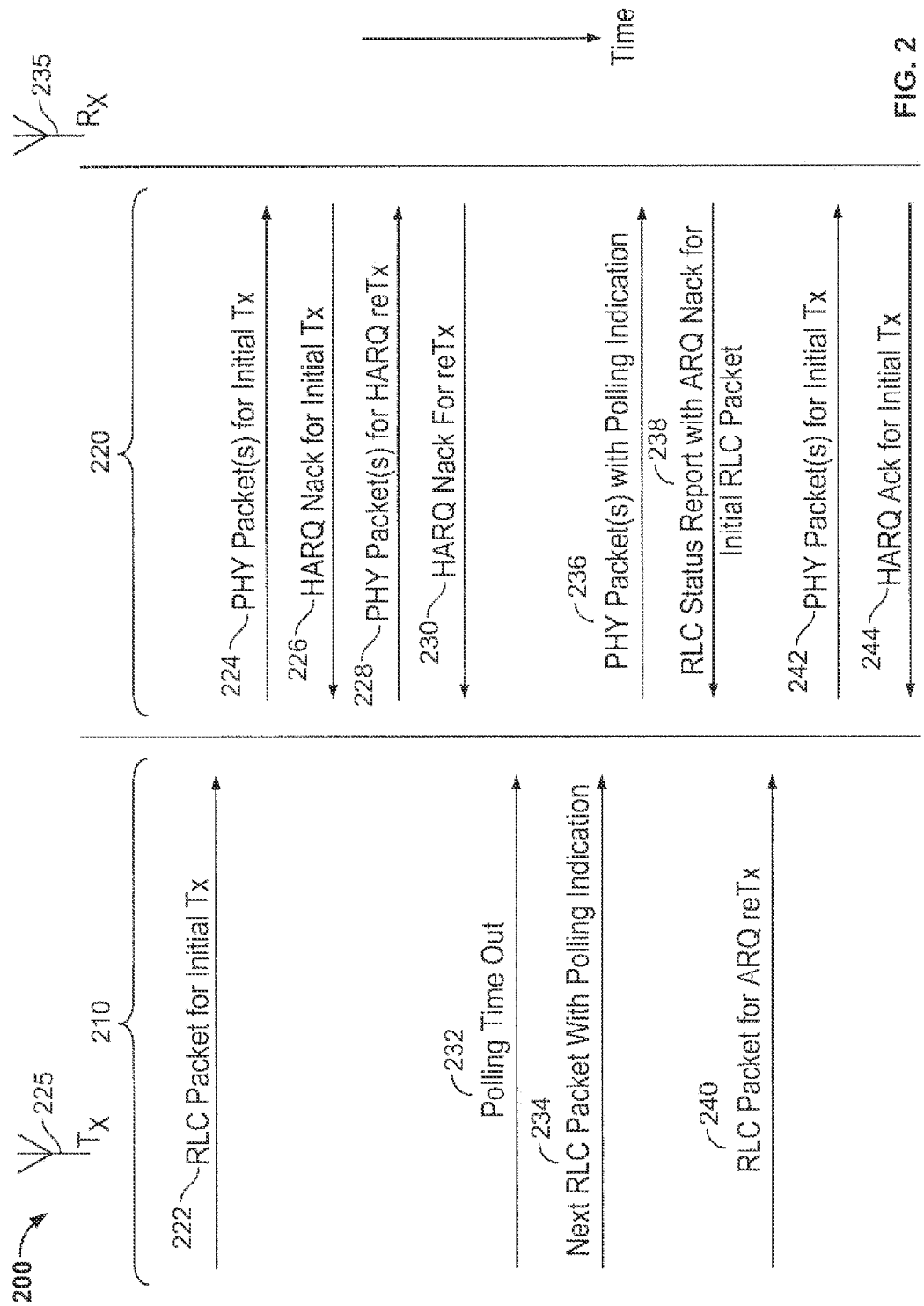
FIG. 2 illustrates ARQ and HARQ transmissions over time when a transmitter initiates an ARQ retransmission in accordance with some implementations.

FIG. 2 illustrates ARQ and HARQ transmissions over time when a transmitter initiates an ARQ retransmission in accordance with some implementations. In particular, column 210 lists commands and/or data generated internally at transmitter 225 and column 220 lists commands and/or data transmitted through a physical channel, either from the transmitter 225 to a receiver 235 or from the receiver 235 to the transmitter 225.

At time 222, the transmitter 225 generates an RLC layer packet for an initial transmission. The transmitter 225 processes the RLC layer packet to produce one or more corresponding PHY layer packet(s). At time 224, the PHY layer packet(s) are transmitted from the transmitter to the receiver 235. The receiver 235, however, is not able to properly decode the PHY layer packet(s). For example, the receiver 235 may receive the PHY layer packet(s) but be unable to properly decode the information of the PHY layer packet(s), or the receiver 235 may not receive or may not detect reception of the PHY layer packet(s).

At time 226, because the receiver 235 is not able to properly decode the PHY layer packet, a HARQ NACK message corresponding to the PHY layer packet transmitted at the time 224 is sent to the transmitter 225. In response, at time 228, the PHY layer packet(s) originally sent at the time 224 are retransmitted by the transmitter 225. In particular, because HARQ is used, the PHY layer packets are retransmitted using the same or different length, modulation, and coding scheme, so as to be combinable with any copies of the PHY layer packets received in the prior transmission at the time 224.

At time 230, assuming that the receiver 235 is not able to properly decode the PHY layer packet(s) based on any combination of PHY layer packet(s) received at the times 224 and 228, the receiver 235 sends a second HARQ NACK message corresponding to the PHY layer packet transmitted at the time 224 (and also the time 228) to the transmitter 225. This process of transmitting repeated HARQ NACKS from the receiver 235 to the transmitter 225 continues until either the PHY layer packet(s) are able to be properly decoded at the receiver 235 (this scenario is not explicitly illustrated in FIG. 2) or until the transmitter declares a polling time out. Specifically, for each PHY layer packet, the transmitter 225 maintains an associated counter to measure a time until a HARQ ACK is received corresponding to the PHY layer packet. If a HARQ ACK is not received for a given PHY layer packet before expiry of the corresponding counter, then a polling time out is declared.

At time 232, a polling time out is declared corresponding to the PHY layer packet(s) first transmitted at the time 224. Accordingly, when the transmitter 225 generates a next RLC layer packet for transmission, at time 234, it includes in the RLC layer packet a polling indication request. The transmitter 225 then processes the RLC layer packet to produce one or more corresponding PHY layer packet(s). At time 236, the PHY layer packet(s) that include the polling indication request are transmitted from the transmitter 225 to the receiver 235. At time 238, in response to receiving the polling indication request, the receiver 235 transmits an RLC status report to the transmitter 225. In particular, the RLC status report includes a list of all RLC layer packet(s) which the receiver has not yet received and provides an ARQ (rather than HARQ) NACK message for each of these RLC layer packet(s). Thus, upon receiving the RLC status report, the transmitter 210 receives an ARQ NACK for the PHY layer packet(s) first transmitted at the time 224.

At time 222, the transmitter 225 generates the RLC layer packet for a retransmission of the RLC layer packet first generated at the time 224. Further, the transmitter 225 then processes the RLC layer packet(s) generated at the time 240 to produce one or more corresponding PHY layer packet(s). In particular, as compared to the PHY layer packet(s) generated at the time 224, the PHY layer packet(s) generated at the time 242 may be segmented into smaller or larger packets upon retransmission (to increase an effective signal to noise ratio), and/or a modulation type or coding scheme associated with the PHY layer packet(s) may be changed upon the retransmission. At time 242, the PHY layer packet(s) corresponding to the RLC layer packet generated at the time 240 are transmitted to the receiver 235. Assuming that the receiver 235 correctly receives and is able to decode the received PHY layer packet(s), the receiver transmits a HARQ ACK message for the sequence number corresponding to the packet(s) transmitted at the times 224, 228, and 242 at time 244.

Figure 3:
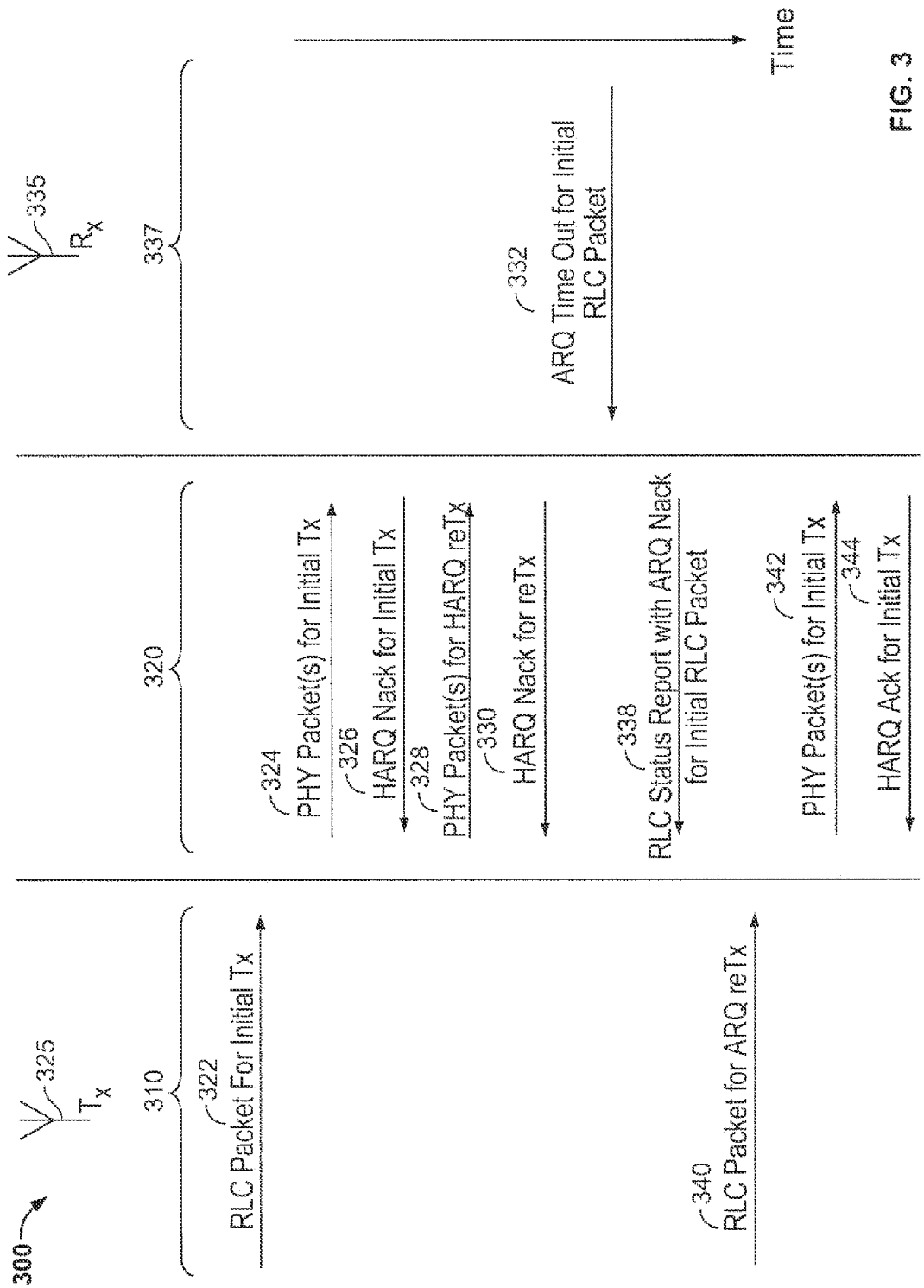
FIG. 3 illustrates ARQ and HARQ transmissions when a receiver initiates an ARQ retransmission in accordance with some implementations.

FIG. 3 illustrates ARQ and HARQ transmissions when a receiver initiates an ARQ retransmission in accordance with some implementations. In particular, column 310 lists commands and/or data generated internally at transmitter 325. Column 320 lists commands and/or data transmitted through a physical channel, either from the transmitter 325 to a receiver 335 or from the receiver 335 to the transmitter 325. Column 337 lists commands and/or data generated internally at receiver 325. Flow diagram 300 illustrates a scenario that starts similarly to that of the flow diagram 200 of FIG. 2.

Actions or data commands associated with times 322, 324, 326, 328, and 330 of the flow diagram 300 are identical to actions or data commands associated with times 222, 224, 226, 228, and 230, respectively, of the flow diagram 200. In particular, at time 322, the transmitter 325 generates an RLC layer packet for an initial transmission. The transmitter 325 then processes the RLC layer packet to produce one or more corresponding PHY layer packet(s). At time 324, the PHY layer packet(s) are transmitted from the transmitter 325 to the receiver 335. The receiver 335, however, is not able to properly decode the PHY layer packet(s). For example, the receiver 335 may receive the PHY layer packet(s) but be unable to properly decode the information of the PHY layer packet(s), or the receiver may not receive or may not detect reception of the PHY layer packet.

At time 326, because the receiver 335 is not able to properly decode the PHY layer packet, a HARQ NACK message corresponding to the PHY layer packet transmitted at the time 324 is sent to the transmitter 325. In response, at time 328, the PHY layer packet(s) originally sent at the time 324 are retransmitted by the transmitter 325. In particular, because HARQ is used, the PHY layer packets are retransmitted using the same or different length, modulation, and coding scheme so as to be combinable with any copies of the PHY layer packets received in the prior transmission at the time 324. At time 330, if the receiver 335 is not able to properly decode the PHY layer packet based on any combination of PHY layer packet(s) received at the times 324 and 328, the receiver 335 sends a second HARQ NACK message corresponding to the PHY layer packet transmitted at the time 324 (and also the time 328) to the transmitter 325.

In contrast to the flow diagram 200, the flow diagram 300 illustrates the case where a receiver (rather than a transmitter) initiates an ARQ retransmission. Accordingly, the process of transmitting repeated HARQ NACKS from the receiver 335 to the transmitter 325 continues until either the packet(s) are able to be properly decoded at the receiver 335 (this scenario is not explicitly illustrated in FIG. 3) or until the transmitter 335 declares a time out. Specifically, for each RLC layer packet, the transmitter 325 maintains an associated counter to measure a time until the RLC layer packet is received. If the RLC layer packet is not received before expiry of the corresponding counter, then a time out is declared by the receiver 335. In this case, as illustrated by the actions at the time 332 of FIG. 3, the receiver 335 issues an ARQ time out for the unreceived RLC layer packet.

At time 338, the receiver 335 transmits a RLC status report to the transmitter 325. In particular, the RLC status report includes a list of all RLC layer packet(s) which the receiver has not yet received and provides an ARQ NACK message for each of these RLC layer packets. Thus, upon receiving the RLC status report, the transmitter 325 receives an ARQ NACK for the PHY layer packet(s) first transmitted at the time 324.

At time 322, the transmitter 325 generates the RLC layer packet for a retransmission of the RLC layer packet first generated at the time 324. Further, the transmitter 325 then processes the RLC layer packet(s) generated at the time 340 to produce one or more corresponding PHY layer packet(s). In particular, as compared to the PHY layer packet(s) generated at the time 324, the PHY layer packet(s) generated at the time 342 may be segmented into smaller or larger packets upon retransmission (to increase an effective signal to noise ratio), and/or a modulation type or coding scheme associated with the PHY layer packet(s) may be changed upon the retransmission. At time 342, the PHY layer packet(s) corresponding to the RLC layer packet generated at the time 340 are transmitted to the receiver 335. Assuming that the receiver 335 correctly receives and is able to decode the received PHY layer packet(s), the receiver transmits a HARQ ACK message for the sequence number corresponding to the packet(s) transmitted at the times 324, 328, and 342 at time 344.

Figure 4:
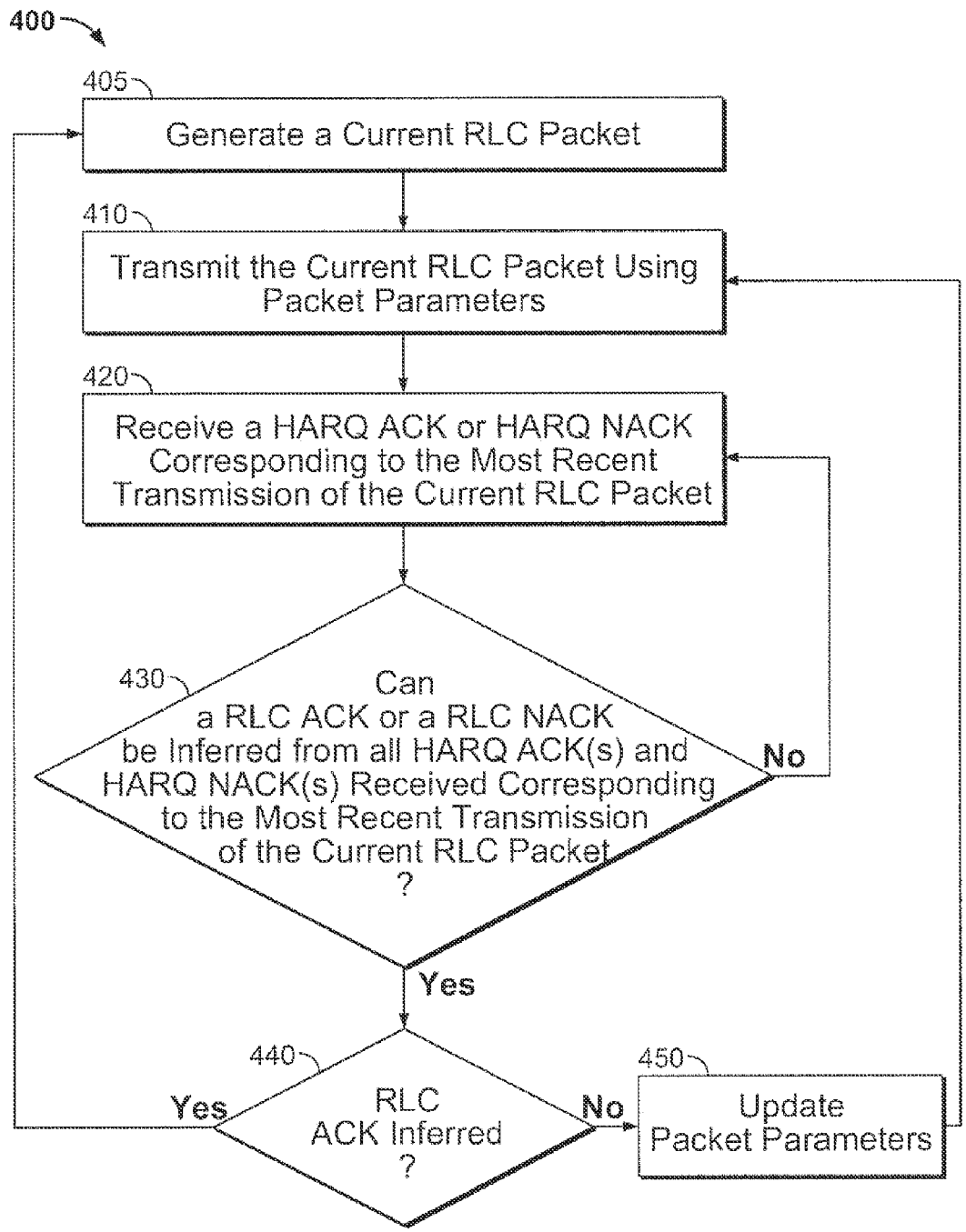
FIG. 4 illustrates a cross-layer process by which a transmitter infers RLC ACK and NACK messages, and retransmits RLC layer packets, based on HARQ ACK and NACK messages in accordance with some implementations.

The transmission techniques described above in relation to FIGS. 2 and 3 employ independent (higher level) HARQ and (lower level) ARQ protocols and do not specify any mechanism of utilizing HARQ feedback for ARQ operations. As such, in the techniques described in relation to FIGS. 2 and 3, RLC status reports which include ACK/NACK feedback for RLC layer packet(s) are generated based on time out parameters (and not based on HARQ transmissions) and used to figure out which RLC layer packet(s) need to be retransmitted according to an ARQ protocol. Described next in relation to FIG. 4 are techniques whereby a transmitter may infer the status of RLC layer packets based on physical layer HARQ ACK and NACK feedback. The techniques described in relation to FIG. 4 do not use RLC polling status commands or RLC status reports. For example, according to the techniques of FIG. 4, a transmitter does not trigger an RLC polling status command even if a corresponding polling timer expires (such a timer is effectively ignored at the transmitter). Further, a receiver does not transmit a RLC status report as the ARQ timer at the receiver is disabled (e.g., set to a large numerical value). In these techniques, a scheduler included as a part of the transmitter stores segmentation, concatenation, multiplexing, and mapping information. Benefits of the proposed approach include saving RLC control overhead by eliminating polling and status report generation as well as reducing a latency associated with ARQ retransmission decisions at a transmitter.

FIG. 4 illustrates a cross-layer process by which a transmitter infers RLC ACK and NACK messages, and retransmits RLC layer packets, based on HARQ ACK and NACK messages in accordance with some implementations. At 405, the transmitter generates a current RLC layer packet. At 410, the transmitter transmits the current RLC layer packet using a set of packet parameters. In particular, the RLC layer packet is converted into one or more PHY layer packet(s) based on the packet parameters prior to transmission. The packet parameters specify a data format or type for the PHY layer packet(s) and the packet parameters may include one or more of a PHY layer packet length, modulation type, and coding scheme parameter. Each of 420, 430, 440, and 450 may be performed by a scheduler component of a transmitter. The scheduler may be implemented using suitable circuitry, software, or a combination thereof.

At 420, the transmitter (e.g., the scheduler) receives a HARQ ACK or HARQ NACK message corresponding to the most recent transmission of the current RLC layer packet. At 430, the transmitter (e.g., the scheduler) determines if an RLC ACK or RLC NACK may be inferred from all of the HARQ ACK(s) and HARQ NACK(s) that have been received corresponding to the most recent transmission of the current RLC layer packet. That is, in addition to the HARQ ACK or HARQ NACK received at the most recent instance of 430, all other HARQ ACK(s) and HARQ NACK(s) that may have been received during previous iterations of 430 but after the most recent transmission of the current RLC layer packet are also used by the transmitter to determine if an RLC ACK or RLC NACK may be inferred.

In some implementations, an RLC ACK is inferred at 430 if a pre-specified number of HARQ ACK(s) are consecutively received, where the pre-specified number may be one. Similarly, in some implementations, an RLC NACK is inferred at 430 if a pre-specified number of HARQ NACK(s) are consecutively received, where the pre-specified number may be one. If an RLC ACK or RLC NACK may be inferred at 430, then the inference is made at 430, and the process 400 proceeds to 440.

On the other hand, if an RLC ACK or RLC NACK is not inferable at 430, then the process 400 returns to step 420 to collect at least one additional. HARQ ACK or HARQ NACK sample corresponding to the most recent transmission of the current RLC layer packet.

At 440, it is determined whether an RLC ACK (as opposed to a RLC NACK) is inferred. If an RLC ACK is inferred at 440, then process 400 proceeds to 450. At 450, a next RLC layer packet is generated and transmitted as the current RLC layer packet, and the process 400 returns to 420. If, on the other hand, an RLC NACK is inferred at 440, then the process 400 proceeds to 450. At 450, the packet parameters are updated. For example, one or more of the PHY layer packet length, the modulation type, and the coding scheme parameter may be updated. The process 400 then returns to 410 and the transmitter transmits the current RLC layer packet again, this time using the updated set of packet parameters.

In the technique of FIG. 4, the transmitter (e.g., the scheduler) infers RLC layer packet ACK and NACK messages and so the scheduler does not generate a polling status request (in contrast to the activity conducted at time of FIG. 2). However, in some implementations, and in order to comply with the GPP LTE standard, the scheduler still maintains and increases a polling counter. In some implementations of the process 400, the receiver does not transmit any RLC status report to the transmitter (since such a status report is not used in the process 400). To disable this feature of a receiver, in some implementations, an ARQ time out counter is disabled or set to an effective value of "infinity" to prevent transmission of RLC status reports from the receiver.

The above described implementations are presented for the purposes of illustration and not of limitation. Other embodiments are possible and one or more parts of techniques described above may be performed in a different order (or concurrently) and still achieve desirable results. In addition, techniques of the disclosure may be implemented in hardware, such as on an application-specific integrated circuit (ASIC) or on a field-programmable gate array (FPGA). The techniques of the disclosure may also be implemented in software.

What is claimed is:

1. A system for retransmitting packets of data, the system comprising:
    processing circuitry configured to generate a Radio Link Control (RLC) layer data packet;
    transmission circuitry configured to
        convert the RLC layer data packet to one or more physical (PHY) layer data packets, and
        transmit the one or more PHY layer data packets, and
        permanently disable transmission of RLC polling status messages; and
    scheduling circuitry configured to
        receive at least one of a hybrid automatic transmission request (HARQ) acknowledgement (ACK) message and a HARQ negative acknowledgment (NACK) message from a receiver in response to transmission of the one or more PHY layer data packets, and
        determine whether the at least one of the HARQ ACK message and the HARQ NACK message represents a automatic transmission request (ARQ) ACK message or a ARQ NACK message.

2. The system of claim 1, wherein the transmission circuitry is further configured to re-convert the RLC layer data packet into one or more additional PHY layer data packets in response to a determination that the at least one of the HARQ ACK message and the HARQ NACK message represents the ARQ NACK message.

3. The system of claim 2, wherein the transmission circuitry is further configured to:
    convert the RLC layer data packet to one or more PHY layer data packets based on (i) a packet size parameter, (ii) a modulation type parameter, and (iii) a coding scheme parameter,
    after the converting, change at least one of (i) the packet size parameter, (ii) the modulation type parameter, and (iii) the coding scheme parameter, and
    re-convert the RLC layer data packet into one or more additional PHY layer data packets based on the change.

4. The system of claim 1, wherein the RLC layer data packet is a current RLC layer data packet, and wherein the processing circuitry is further configured to generate a new RLC layer data packet in response to a determination that the at least one of the HARQ ACK message and the HARQ NACK message represents the ARQ ACK message.

5. The system of claim 1, wherein the at least one of the HARQ ACK message and the HARQ NACK message comprises at least two HARQ ACK messages or at least two HARQ NACK messages.

6. The system of claim 1, wherein the receiver is configured to disable transmission of RLC status reports.

7. The system of claim 1, wherein the scheduling circuitry is further configured to determine that the at least one of a HARQ ACK message and the HARQ NACK message represents the ARQ NACK message in response to receiving a pre-specified number of consecutive HARQ NACK messages.

8. The system of claim 1, wherein the determination of whether the at least one of the HARQ ACK message and the HARQ NACK message represents the ARQ ACK message or the ARQ NACK message is made once every 35-45 milliseconds (ms).

9. The system of claim 1, wherein the receiver is configured to transmit HARQ ACK messages and HARQ NACK messages according to a Third Generation Partnership Project Long Term Evolution (3GPP LTE) or Worldwide Interoperability for Microwave Access (WiMAX) standard.

10. A method for retransmitting packets of data, the method comprising:
    generating a Radio Link Control (RLC) layer data packet;
    converting the RLC layer data packet to one or more physical (PHY) layer data packets,
    transmitting the one or more PHY layer data packets,
    permanently disabling transmission of RLC polling status messages,
    receiving at least one of a hybrid automatic transmission request (HARQ) acknowledgement (ACK) message and a HARQ negative acknowledgment (NACK) message from a receiver in response to transmission of the one or more PHY layer data packets; and
    determining whether the at least one of the HARQ ACK message and the HARQ NACK message represents a automatic transmission request (ARQ) ACK message or a ARQ NACK message.

11. The method of claim 10, further comprising re-converting the RLC layer data packet into one or more additional PHY layer data packets in response to a determination that the at least one of the HARQ ACK message and the HARQ NACK message represents the ARQ NACK message.

12. The method of claim 11, further comprising:
    converting the RLC layer data packet to one or more PHY layer data packets based on (i) a packet size parameter, (ii) a modulation type parameter, and (iii) a coding scheme parameter, after the converting, changing at least one of (i) the packet size parameter, (ii) the modulation type parameter, and (iii) the coding scheme parameter, and re-converting the RLC layer data packet into one or more additional PHY layer data packets based on the change.

13. The method of claim 10, wherein the RLC layer data packet is a current RLC layer data packet and further comprising generating a new RLC layer data packet in response to a determination that the at least one of the HARQ ACK message and the HARQ NACK message represents the ARQ ACK message.

14. The method of claim 10, wherein the at least one of the HARQ ACK message and the HARQ NACK message comprises at least two HARQ ACK messages or at least two HARQ NACK messages.

15. The method of claim 10, further comprising disabling transmission of RLC status reports.

16. The method of claim 10, further comprising determining that the at least one of a HARQ ACK message and the HARQ NACK message represents the ARQ NACK message in response to receiving a pre-specified number of consecutive HARQ NACK messages.

17. The method of claim 10, further comprising determining whether the at least one of the HARQ ACK message and the HARQ NACK message represents the ARQ ACK message or the ARQ NACK message every 35-45 milliseconds (ms).

18. The method of claim 10, further comprising transmitting HARQ ACK messages and HARQ NACK messages according to a Third Generation Partnership Project Long Term Evolution (3GPP LTE) or Worldwide Interoperability for Microwave Access (WiMAX) standard.

\* \* \* \* \*